W. O. KUHN.
TRANSMISSION GEARING FOR MOTOR VEHICLES.
APPLICATION FILED JULY 13, 1915.
1,187,340.
Patented June 13, 1916.
2 SHEETS—SHEET 1.
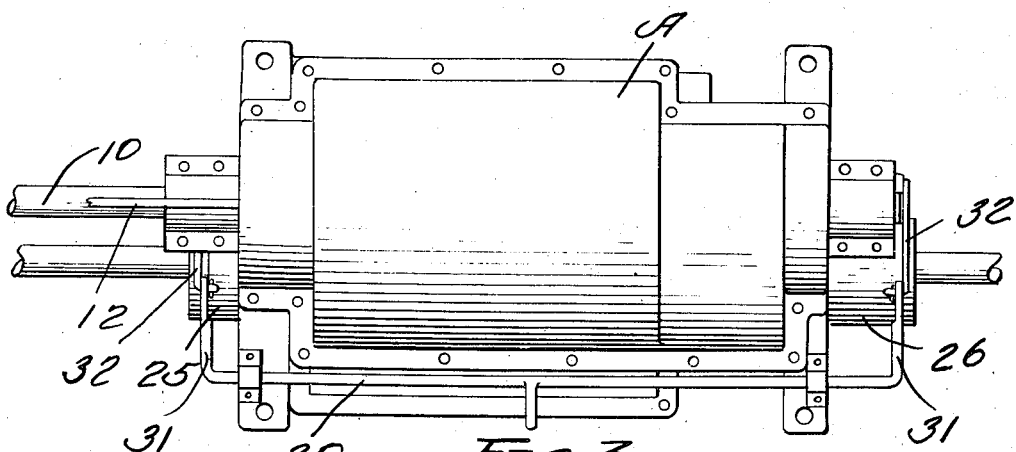
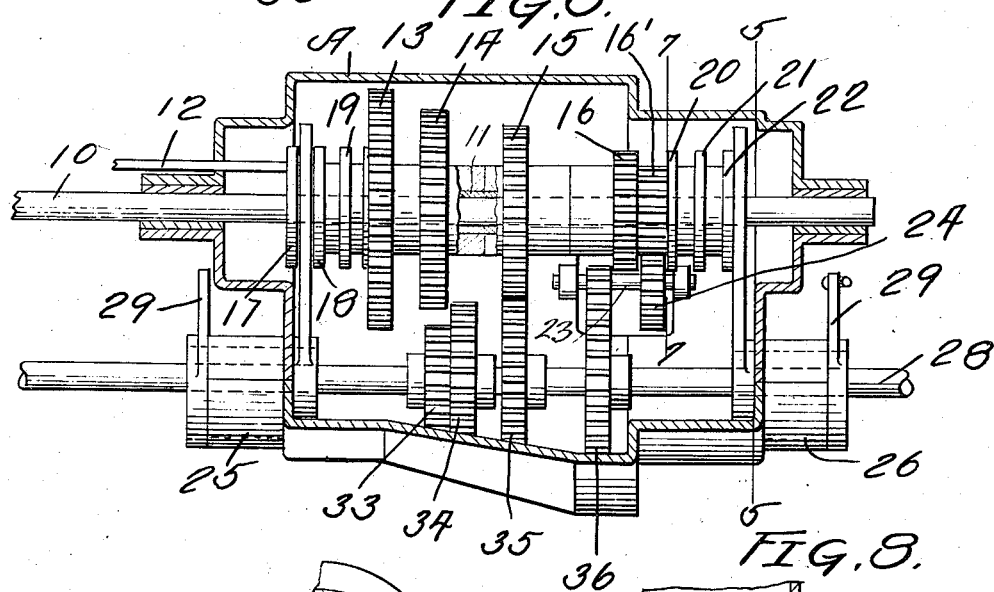
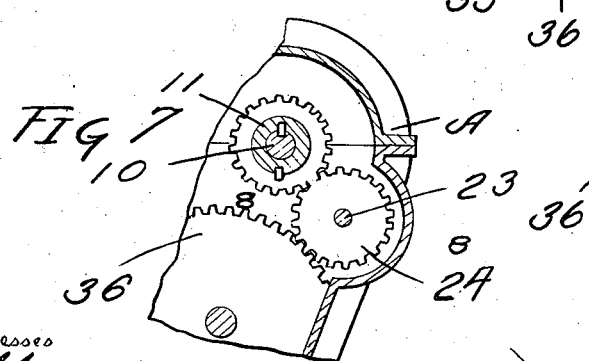
Inventor:
W. O. Kuhn

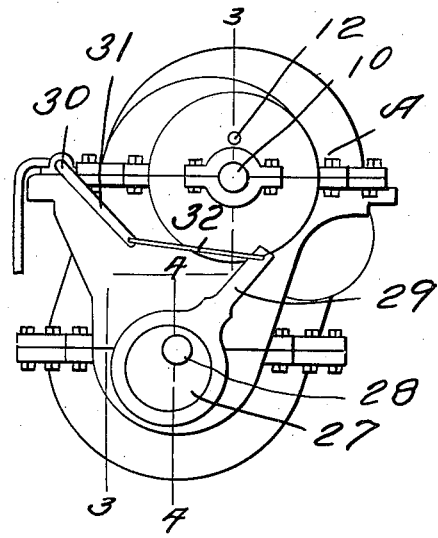
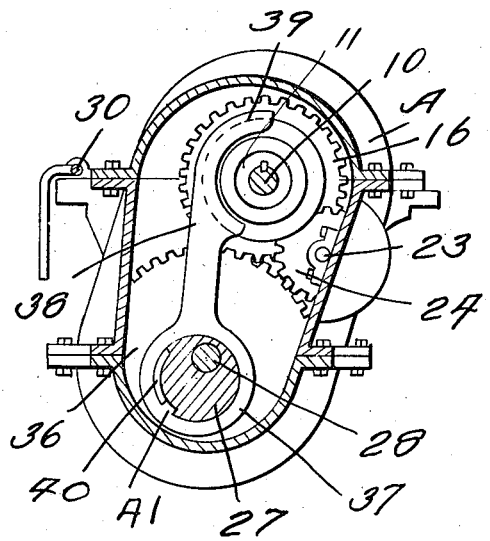
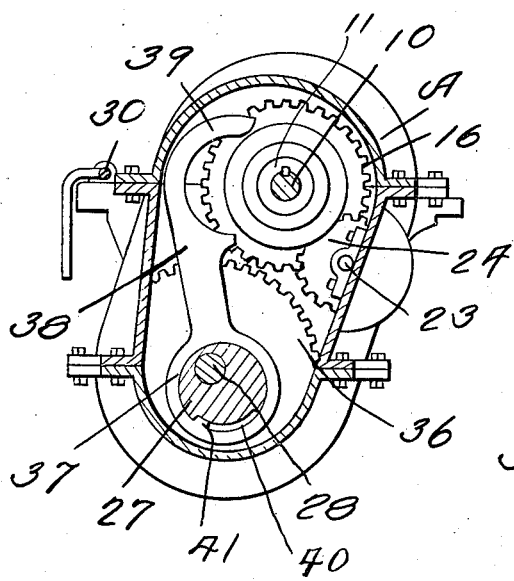
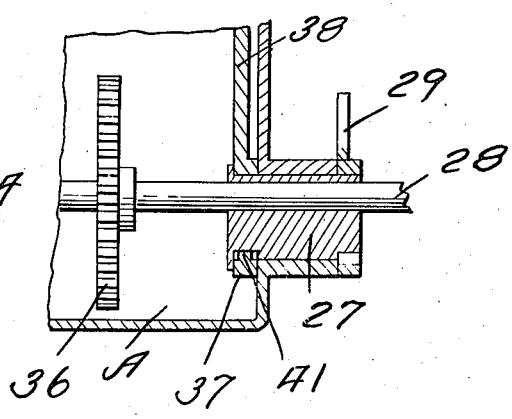

UNITED STATES PATENT OFFICE.

WILLIAM O. KUHN, OF WEBER, WASHINGTON.

TRANSMISSION-GEARING FOR MOTOR-VEHICLES.

1,187,340. Specification of Letters Patent. Patented June 13, 1916.

Application filed July 13, 1915. Serial No. 39,664.

*To all whom it may concern:*

Be it known that I, WILLIAM O. KUHN, a citizen of the United States, residing at Weber, in the county of Grant, State of Washington, have invented certain new and useful Improvements in Transmission-Gearing for Motor-Vehicles; and I do hereby declare the following to be a full, clear, and exact description of the invention, such as will enable others skilled in the art to which it appertains to make and use the same.

This invention relates to transmission gearing for motor vehicles.

It is my purpose to provide an improved transmission gearing in which the shifting of the gears for the purpose of varying the speed or reversing the direction of rotation of the line shaft is accomplished when the gears on the respective shafts are disposed entirely out of mesh, by such a structure I entirely avoid any possibility of stripping the gears during the shifting thereof.

It is my further purpose to provide a locking device which positively prevents shifting of the gears while they are in mesh and in addition positively prevents the engagement of the gears on the line shaft with the gears on the engine shaft until the gears on one shaft are properly positioned for engaging the gears on the other shaft.

It is also my purpose to provide a transmission gearing particularly adapted for use in connection with a four wheel drive vehicle and in which the shifting of the gears can be accomplished with ease and facility.

With the above and other purposes in view the invention consists in the details of construction and in the arrangement and combination of parts to be hereinafter more fully described and particularly pointed out in the appended claims.

In describing the invention in detail reference will be had to the accompanying drawings wherein like characters of reference denote corresponding parts in the several views, and in which—

Figure 1 is a plan view of a transmission gearing constructed in accordance with the invention; Fig. 2, is an end view of same; Fig. 3, a section on the line 3—3 of Fig. 2; Fig. 4, a section on the line 4—4 of Fig. 2; Fig. 5, a section on the line 5—5 of Fig. 3; Fig. 6, a view similar to Fig. 5 with the parts in the position they would occupy when the gears on the line shaft are entirely disengaged from the gears on the engine shaft; Fig. 7, a section on the line 7—7 of Fig. 3, and Fig. 8, a section on the line 8—8 of Fig. 7.

Referring to the drawings the improved transmission gearing is shown as comprising a casing A suitably shaped and formed of a plurality of sections for convenience in assembling the transmission.

Rotatably mounted in opposite ends of the casing A is the engine shaft 10 which has splined thereon within the casing A a sleeve 11 one end of which has connected thereto an operating rod 12 slidably engaged through the adjacent end of the casing and adapted to be suitably connected to an operating lever (not shown) disposed convenient to the driver of a motor vehicle and whereby the sleeve 11 may be moved longitudinally on the shaft 10 for a purpose that will presently appear. Fixed upon the sleeve 11 are gears 13, 14, 15, 16 and 16'. Formed on the sleeve 11 between the gear 13 and the adjacent end of the casing A are circumscribing flanges 17, 18 and 19, while corresponding circumscribing flanges 20, 21 and 22 are formed on the sleeve 11 between the gear 16' and the adjacent end of the casing. Mounted in the casing A is a shaft 23 and loosely rotating on this shaft is a pinion 24 which constantly meshes with the gear 16' and projects between the gear 16 and the flange 20 so as to be held against movement longitudinally of the shaft 23 except when the sleeve 11 is moved longitudinally of the shaft 10.

Formed integral with the casing A and projecting from opposite ends thereof respectively are alined bearings 25 and 26 in each of which is rotatably mounted a cylinder 27 and rotatably supported by these cylinders eccentric with respect to the latter is a line shaft 28. Fixed on the outer end of each cylinder 27 is a lever 29 for a purpose that will presently appear. Rotatably mounted on the casing A is a shaft 30 having fixed on respective ends thereof arms 31 which are connected respectively to the free ends of the levers 29 by means of links 32. The shaft 30 is adapted to be rotated by the driver of the motor vehicle in any suitable manner. Fixed on the shaft 28 are gears 33, 34, 35 and 36 which are adapted to mesh respectively with the gears 13, 14, 15 and 16 in the operation of the transmission to vary the speed of rotation of the shaft 28. The gear 36 is also adapted to mesh with the pinion 24 for the purpose of reversing the rotation of the shaft 28.

Loosely mounted on the inner end of each cylinder 27 is a ring 37 from which extends an arm 38 having an arcuate free end 39 adapted in one position to receive the sleeve 11. The arm 38 at one end of the casing A is adapted to be disposed between the flanges 20, 21 and 22 for the purpose of locking the sleeve 11 against sliding movement on the shaft 10, and likewise the arm 38 at the other end of the casing A is adapted to be disposed between the flanges 17, 18 and 19 for a similar purpose. Each of the cylinders 27 is provided in its periphery with a groove 40 disposed within the related ring 37. Each ring 37 has formed on its inner wall a stud 41 engaged in the related groove 40.

Assuming the parts to be in the position shown in Fig. 3 and it is desired to increase the speed by bringing the gears 34 and 14 into mesh the driver will rotate the shaft 30 which will in turn rotate the cylinders 27 through the medium of the levers 29. The initial rotation of the cylinders 27, owing to the fact that the shaft 28 is eccentric to the cylinders, will swing the shaft 28 bodily away from the shaft 10 so that none of the gears on the sleeve 11 will mesh with any of the gears on the shaft 28. As soon as the shaft 28 has been moved bodily a sufficient distance to effect this complete disengagement of gears the wall of the groove 40 will engage the stud 41 so that continued rotation of the cylinders 27 will swing the arms 38 from embracing relation with respect to the sleeve 11 and from between the flanges 17 and 18. When the arms 38 have been thus moved the driver can slide the sleeve 11 to bring the desired gear thereon in line with the desired gear on the shaft 28. When the sleeve 11 has been thus adjusted the shaft 30 is rotated in the opposite direction and the shaft 28 and arms 38 returned to their normal or operative position.

It will thus be seen that the structure heretofore described positively prevents the gears on respective shafts being brought into mesh until such gears are properly alined owing to the fact that if attempt is made to move the shaft 28 to normal or operative position when the desired gears are not alined the arms 38 will engage the peripheries of certain of the flanges on the sleeve 11 and prevent movement of the shaft 28 to complete operative position. It will be further obvious that the arms 38 lock the sleeve 11 against any sliding movement while respective gears of the transmission are in mesh and thus avoid the possibility of stripping the gears. I further avoid stripping of the gears by dispensing with bringing them into mesh by endwise movement.

What is claimed is:—

1. In a transmission gear mechanism, the combination of a casing, a driving shaft, a sleeve splined on said driving shaft, a plurality of spaced circumscribing flanges on said sleeve, alined cylinders rotatably mounted in the casing, a driven shaft rotatably supported by said cylinders and disposed eccentrically with respect to the latter, means for rotating said cylinders to move the driven shaft bodily toward and away from the driving shaft, and arms movable under the influence of the rotation of said cylinders and adapted to engage between adjacent flanges on the sleeve when the driven shaft has moved to its limit toward the driving shaft to lock the sleeve against sliding movement on the driving shaft.

2. In a transmission gear mechanism, the combination of a casing, a driving shaft, a sleeve splined on said driving shaft, alined cylinders rotatably mounted in the casing, a driven shaft rotatably supported by said cylinders and disposed eccentrically with respect to the latter, means for rotating said cylinders to move the driven shaft bodily toward and away from the driving shaft, a ring loosely mounted on each cylinder within the casing, an arm on each ring adapted to interlock with the sleeve when the driven shaft has moved to its limit toward the driving shaft to secure the sleeve against sliding movement, and a stud on the inner wall of each ring engageable in a groove on the related cylinder whereby the final rotation of the cylinders in opposite directions will swing said arms into and out of interlocking relation with the sleeve.

In testimony whereof, I affix my signature, in the presence of two witnesses.

WILLIAM O. KUHN.

Witnesses:
  FRANK J. KOLMAN,
  C. TONSEY TAYLOR.